June 16, 1942.   C. M. LEE   2,286,819
NONREFLECTING COATING FOR GLASS
Filed Sept. 28, 1940

TO VACUUM PUMP

CHARLES M. LEE
INVENTOR

BY *Newton M. Perrudo*
ATTORNEY

Patented June 16, 1942

2,286,819

UNITED STATES PATENT OFFICE 2,286,819

NONREFLECTING COATING FOR GLASS

Charles M. Lee, Rochester, N. Y., assignor to Eastman Kodak Company, Rochester, N. Y., a corporation of New Jersey Application September 28, 1940, Serial No. 358,845

5 Claims. (Cl. 91—12.2)

This invention relates to apparatus for coating the surface of glass with interference layers to prevent Fresnel reflections.

One form of reflection obviating layer namely a metallic fluoride on glass, has been proposed by Professor Strong in the Journal of the Optical Society of America, January 1936, vol. 26, page 73, wherein he refers to the maxima and minima of the reflection as the film thickness varies and points out that the minimum is zero only when the index of the coating is the square root of the index of the glass making his two interface reflections equal. The present invention relates to apparatus for coating the lenses according to Strong's process or according to any of the modifications thereof, of which many have been proposed.

It is an object of the invention to provide a device for holding the lenses which will not interfere with the area thereof to be coated.

It is an object of the invention to provide a device which will permit the lenses to be coated on both sides.

It is a particular object of the invention to provide a lens holding device which permits the lenses to be turned over without involving any operation in which the surfaces of the lenses are touched.

It is an object of the invention to provide a holder of this type which is arranged so that when the lens is turned over, the surface exposed for coating will be the same distance as the previously exposed surface from the filament which carries the coating material.

It is an object of the invention to provide such a holder in which the lenses can be quickly, accurately, and easily assembled.

It is also an object of the invention to provide a lens holder which can be handled easily and conveniently when the lenses are assembled therein.

According to the invention, the lens or lenses to be coated are clamped between two rigid flat metal plates which for convenience are referred to as the upper and lower plates and the lenses are said to be held horizontally although their actual orientation in space is obviously not so limited. Both plates are perforated similarly, the apertures being equal to the surface area of the lens, which area is to be coated. The upper rim of the apertures in the lower plate is provided with a recessed or counterbored portion into which the lens may be dropped. By having the outside diameter of this recessed portion substantially equal to that of the lens, centering of the lens in the plate aperture is assured at least to the accuracy required. The lens is thus supported by its margins.

The upper plate is then placed on top of the lower one with the apertures aligned and the plates are clamped together. The lower rim of the aperture in the upper plate, either with or without a similarly recessed portion, engages the margins of the lens so that the lens is not loose to move when the whole unit is turned over. When these plates are thus clamped, the recessed portions form ring grooves halfway down the apertures. The depth of these grooves is equal to the marginal thickness of the lenses to provide the firm grip referred to above. The lip of the recessed portion or ledge may be rounded off or beveled, but in any case the actual points of contact with the lens must be separated by the lens thickness at that point. In actual use the clamping unit is laid on some support such as a spherical dish or a flat table. This support is in general a fixed distance from the filament from which the fluoride or other material is to be coated. When the unit is turned over it is preferable to have the newly exposed surface of the lens the same distance from the filament as was the first surface, the latter now being down. To insure this, the grooves formed by the recessed portions are, by proper selection of plate thicknesses and shapes, spaced in a plane just half-way between the outermost points of the lower plate and the outermost points of the upper plate.

In a preferred embodiment, three or more legs are provided on each plate and the ends of these legs constitute the outermost points between which the lens plane, defined by the grooves, is midway.

Also in a preferred embodiment, aligning pins in one plate and corresponding holes in the other are provided to permit quick and easy assembly. In one form, the legs for both plates are carried by the lower plate and act as aligning pins extending through and beyond the aligning holes in the upper plate.

The combination of several of these lens holding units side by side on a spherical dish whose center of curvature coincides with the filament, forms a device in which the lenses can be quickly and accurately assembled and handled without any need of touching the lens surfaces. The total area of a unit is small compared to the distance from the filament and hence there is no appreciable difference in the thickness of the coating of the lenses near the edges of the unit from those at the center of the unit. When meniscus lenses are coated, theoretically it should be the center of the lens and not the center of the groove gripping the margins which is halfway between the ends of the upper and lower supporting legs. However, the difference is negligible since the variation in total distance from the filament is relatively small and there are numerous other factors liable to cause greater variations in the amount of coating than this slight difference in distance would cause.

Other objects and advantages of the invention and the invention itself will be fully understood from the following description when read in connection with the accompanying drawing, in which.

Figure 1:
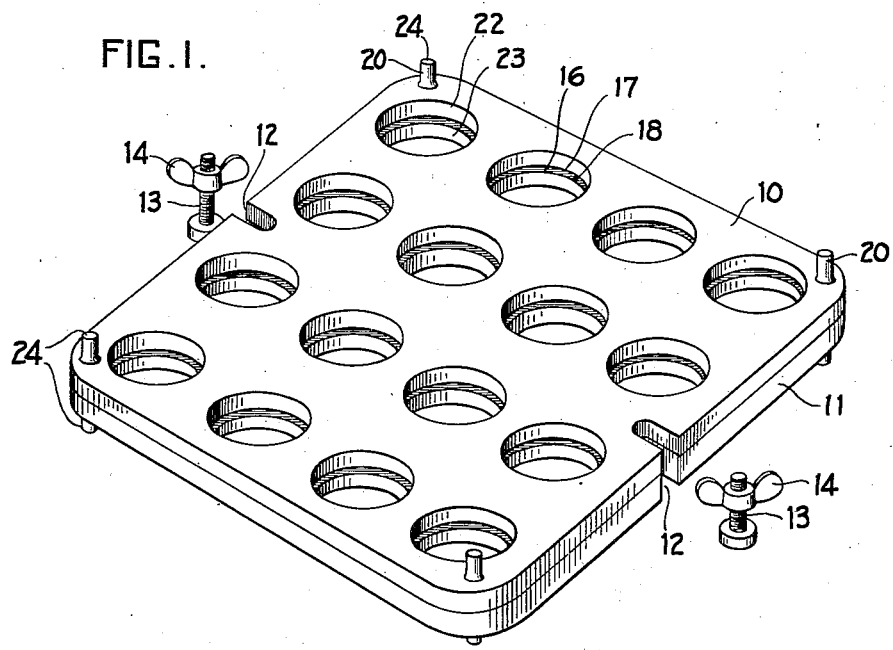
Fig. 1 is a perspective view of one embodiment of the invention.

Since the three figures all relate to the same embodiment of the invention, they will be described together. Lenses such as the lens 15 are clamped between two plates 10 and 11 by suitable clamping means such as indentations 12 into which screws 13 with wing nuts 14 can be fitted. In the embodiment shown, the lens 15 is held in a recessed portion 16 in the upper rim of an aperture 23 in the lower plate 11. The apertures 23 and 22 in the two plates are similar and are in alignment when the plates are clamped. The rear wall 19 of the recessed portion 16 has a diameter substantially equal to or slightly larger than that of the lens 15, so that when the lens is dropped into the recessed portion it is aligned with the aperture in the plates with sufficient accuracy. The aperture is of course equal to the area of the lens to be coated. The lens rests on the lip 18 of the recessed portion 16 and when the upper plate 10 is clamped to the plate 11 the rim 17 of the corresponding aperture grips the top of the lens. The lens is thus held by its margins. This rim 17 may be provided with a recessed portion similar to the portion 16 in the lower plate or may be as shown. However in any case the groove formed by the recessed portion or portions must have a depth equal to the marginal thickness of the lens so that the lens will be firmly gripped.

In order to insure easy, convenient, and accurate alignment of the apertures 22 and 23 when the plates 10 and 11 are being assembled, aligning pins 20 are carried by the plate 11 and complementary holes in the plate 10 are slid onto these aligning pins as the plates are brought together.

It is also desirable for convenience in handling the unit after it is assembled, to have legs extending from the top and bottom of the unit. For convenience in manufacture, the legs 21 extend both from the top and bottom of the lower plate 11 and are carried by this plate. The upper portions 20 of the legs 21 act as the aligning pins, as described above. The ends 24 of the legs form the outermost points of the plates when clamped. To insure that the upper surface of the lens will be the same distance from the support and hence the same distance from the filament which is a fixed distance above the support, the lens 15 must be in a plane midway between the outermost points 24. That is, the recessed portions 16 must be so arranged that the midpoint in their depth is halfway between the outermost points 24.

Figure 3:
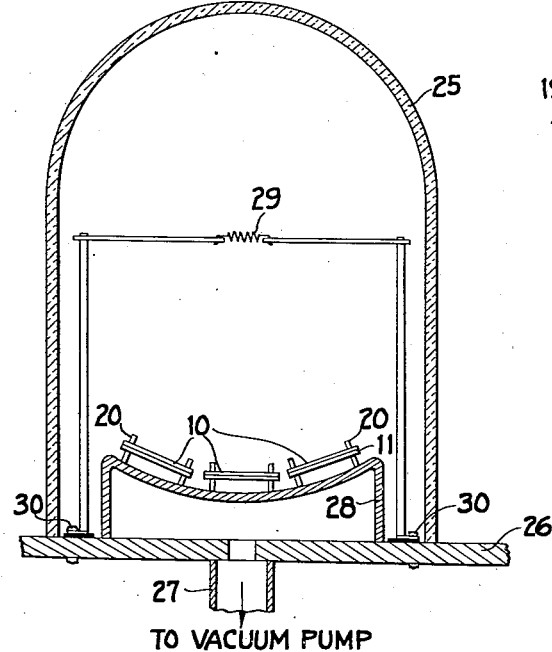
Fig. 3 illustrates the complete assembly according to the invention.
Figure 2:
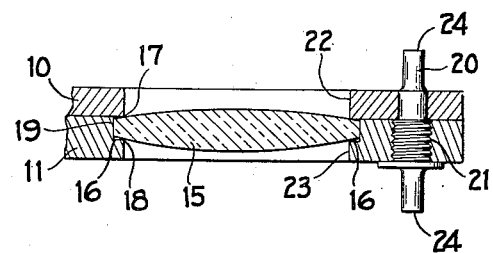
Fig. 2 is a fragmenatry detail in sectional elevation of the arrangement shown in Fig. 1.

In Fig. 3 the units are assembled in a bell jar 25 carried on a metal plate 26 provided with suitable means 27 through which the bell jar may be evacuated. The units are carried by a spherical dish 28 and several of the units are placed adjacent to one another on this dish. The center of curvature of the dish 28 coincides with a filament 29 which carries the material to be coated. The filament 29 is heated electrically through suitable leads 30 in the well-known way.

All of the objects of the invention are obviously accomplished by the device illustrated. Having thus described this preferred embodiment, I wish to point out that the invention is not limited to this specific structure but is of the scope of the appended claims.

What I claim and desire to secure by Letters Patent of the United States is:

1. Apparatus for holding lenses during surface coating thereof comprising two rigid flat metal plates having similar apertures each as large as the surface area of a lens to be coated, means for clamping the plates together with the apertures aligned and means for holding a lens in alignment with each aperture and equally spaced from the outermost points of the two plates when clamped, said lens holding means consisting of a recessed portion around the inside rim of each aperture in at least one of the plates, said portions when the plates are clamped forming ring grooves whose maximum diameter in each case substantially equals that of the lens to be held and whose edges for gripping the lens are separated by the marginal thickness of the lens and are respectively spaced equal distances from said outermost points.

2. Apparatus according to claim 1 in which one plate has a plurality of pins and the other a plurality of holes, said pins and holes being complementary and engaging one another when the plates are clamped in alignment, whereby the operation of aligning the plates is rendered more convenient.

3. Apparatus according to claim 1 in which at least three equal legs extend from the outside of each plate, the ends of the legs constituting said outermost points.

4. Apparatus for holding lenses horizontally during surface coating thereof comprising an upper and a lower rigid flat metal plate, the two plates having similar apertures each as large as the surface area of a lens to be coated, at least three equal legs extending through and from both sides of the lower plate, the upper plate having holes exactly complementary to said legs for engaging the legs to insure alignment of the apertures as the plates are brought together, means for clamping the plates when so brought together and means for holding a lens aligned in each aperture and in a horizontal plane midway between the top and bottom ends of the legs, said lens holding means consisting of a recessed portion in the upper rim of each of the apertures in the lower plate, the maximum diameter of the portion in each case being substantially equal to that of the lens, the depth of the portion being substantially equal to the marginal thickness of the lens and the midpoint in said depth being in said horizontal plane midway between the top and bottom of the legs.

5. Apparatus for holding lenses during surface coating thereof comprising a container, means for evacuating the container, a filament within the container for carrying the coating material, a spherical dish below the filament concentric with the filament, a plurality of flat lens holding units adjacent to one another on the dish, the total diameter of each unit being small compared to the distance from the filament and each unit consisting of two rigid flat metal plates having similar apertures each as large as the surface area of a lens to be coated, means for clamping the plates together with the apertures aligned and means for holding a lens in alignment with each aperture and equally spaced from the outermost points of the two plates when clamped, said lens holding means consisting of a recessed portion around the inside rim of each aperture in at least one of the plates, said portions when the plates are clamped forming ringed grooves whose maximum diameter in each case is substantially equal to that of the lens to be held and whose edges for gripping the lens are separated by the marginal thickness of the lens and are respectively spaced equal distances from said outermost points.

CHARLES M. LEE.